US010053887B2

(12) United States Patent
Chu et al.

(10) Patent No.: US 10,053,887 B2
(45) Date of Patent: Aug. 21, 2018

(54) PROTECTIVE BARRIERS AND RELATED METHODS

(71) Applicant: BATTELLE ENERGY ALLIANCE, LLC., Idaho Falls, ID (US)

(72) Inventors: Henry Shiu-Hung Chu, Idaho Falls, ID (US); Michael Paul Bakas, Raleigh, NC (US); Todd L. Johnson, Shelley, ID (US); James Wade Schondel, Firth, ID (US)

(73) Assignee: BATTELLE ENERGY ALLIANCE, LLC., Idaho Falls, ID (US)

( * ) Notice: Subject to any disclaimer, the term of this patent is extended or adjusted under 35 U.S.C. 154(b) by 358 days.

(21) Appl. No.: 14/841,114

(22) Filed: Aug. 31, 2015

(65) Prior Publication Data

US 2017/0063054 A1    Mar. 2, 2017

(51) Int. Cl.
  *E04H 17/16* (2006.01)
  *F41H 5/24* (2006.01)
  *H02B 5/00* (2006.01)

(52) U.S. Cl.
  CPC ............. *E04H 17/166* (2013.01); *F41H 5/24* (2013.01); *H02B 5/00* (2013.01)

(58) Field of Classification Search
  CPC . F41H 5/023; F41H 5/026; F41H 5/06; F41H 5/24; E04H 17/00; E04H 17/14; E04H 17/16; E04H 17/165; E04H 17/166; E04H 17/18; H02B 1/06; H02B 5/00
  USPC ................................ 256/1, 11, 21, 24, 31, 73
  See application file for complete search history.

(56) References Cited

U.S. PATENT DOCUMENTS

| 8,555 | A | * | 12/1851 | Cole | E04H 17/16 256/31 |
| 25,768 | A | * | 10/1859 | Smith | E04H 17/16 256/31 |
| 63,801 | A | * | 4/1867 | Lefeber | E04H 17/16 256/31 |
| 269,642 | A | * | 12/1882 | Culp | E04H 17/18 256/28 |
| 356,006 | A | * | 1/1887 | Moore | E04H 17/16 256/31 |
| 680,507 | A | * | 8/1901 | Thomas | A01G 9/12 248/436 |
| 694,761 | A | * | 3/1902 | Lathrop | E04H 17/16 160/351 |

(Continued)

*Primary Examiner* — Josh Skroupa
(74) *Attorney, Agent, or Firm* — Traskbritt

(57) ABSTRACT

Protective barriers for protecting assets (e.g., electrical power transformers and other substation components). The protective barrier may include a lower portion and an upper portion. The lower portion may include first and second laterally spaced A-frame structures having a first protective member assembly extending between aligned legs of the respective A-frame structures on one side thereof. The first protective member assembly may include a first plurality of substantially horizontally extending protective members oriented at an angle relative to a horizontal plane. The first and second A-frame structures may have a second protective member assembly extending between aligned legs of the respective A-frame structures on an opposing side thereof. The upper portion may comprise a third protective member assembly. Methods of making a protective barrier are also disclosed.

20 Claims, 7 Drawing Sheets

(56) References Cited

U.S. PATENT DOCUMENTS

| | | | | |
|---|---|---|---|---|
| 4,170,342 | A * | 10/1979 | Miller | E04B 7/00 |
| | | | | 256/26 |
| 6,672,195 | B1 * | 1/2004 | Plattner | B64C 1/1469 |
| | | | | 89/36.04 |
| 7,128,308 | B2 * | 10/2006 | Marsh | E01F 13/12 |
| | | | | 256/13.1 |
| 8,726,780 | B2 * | 5/2014 | White | F41H 5/24 |
| | | | | 89/36.04 |
| 9,470,481 | B2 * | 10/2016 | Livesey | F41H 5/013 |
| 2010/0206158 | A1 * | 8/2010 | Neethling | F41H 5/023 |
| | | | | 89/36.02 |
| 2013/0233164 | A1 * | 9/2013 | Kestermont | E04B 1/10 |
| | | | | 89/36.04 |

* cited by examiner

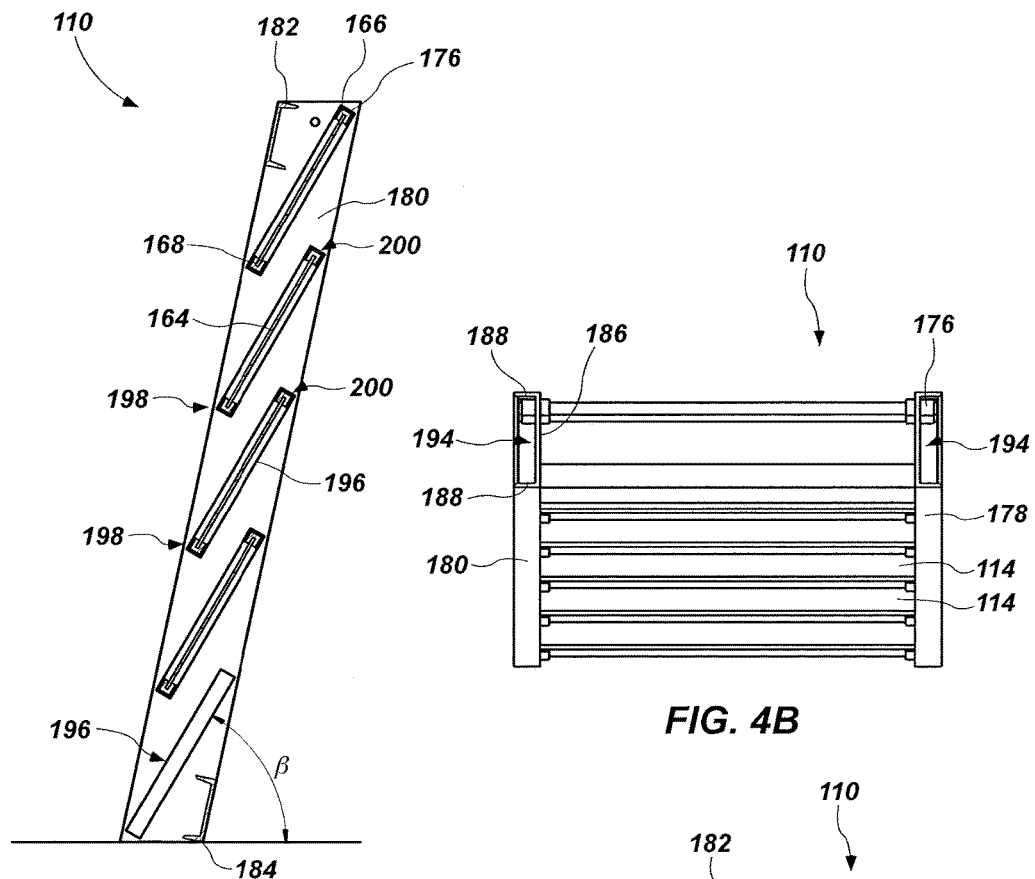
FIG. 4A
FIG. 4B
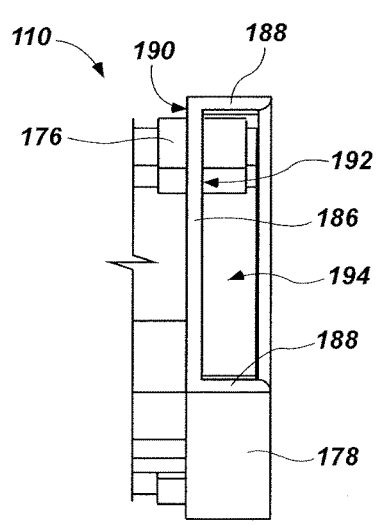
FIG. 4C
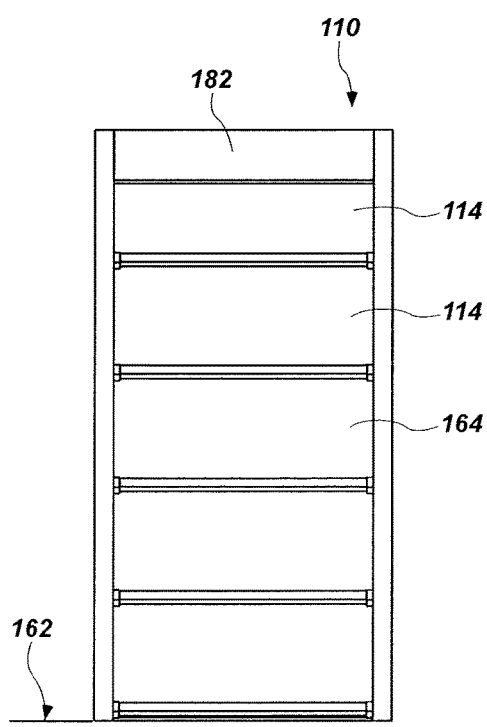
FIG. 4D

PROTECTIVE BARRIERS AND RELATED METHODS

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

This disclosure relates generally to protective barriers for protecting electrical power grid infrastructure including, without limitation, high voltage power transformers, assemblies and systems for incorporating protective barriers, and to related methods.

BACKGROUND

Electrical power transformers and substations are critical to electrical grids and to the electrical infrastructure serving industrial, commercial and residential users. Damaging an electrical power transformer or other substation components can cause mass power outages, resulting in economic and even personnel loss. As has been demonstrated in recent years, unprotected, very expensive electrical power transformers and other substation components can easily be rendered nonfunctional and destroyed by bullets from a high-powered rifle, such as a 7.62 mm (.50 caliber) automatic rifle. As a consequence, electrical power transformers and substations have become recognized as prime targets of terrorists and criminals.

Known barriers for protecting electrical power transformers are often non-portable, expensive, non-repairable, and/or ineffective. For example, current known concrete barriers are relatively non-portable and are not easily repairable. Further, movement and positioning of such concrete barriers often requires the use of heavy equipment. Known panel-type barriers for protecting electrical power transformers often require significant surface anchoring and even pier-type footings to provide stability. Thus, replacing damaged parts of the panel barriers can require construction equipment and machinery. In some cases, repairing such panel barriers can require excavation of the footing. Moreover, known barriers for protecting electrical power transformers are often not repairable on site, but must be transported offsite for repairs.

BRIEF SUMMARY

An embodiment of the disclosure includes a barrier comprising a first A-frame structure having a first leg and a second leg, a second A-frame structure laterally spaced from and oriented parallel to the first A-frame structure and having a third leg and a fourth leg, and a first protective member assembly extending laterally between the first leg and the third leg. The first protective member assembly comprises an elongated first side member located adjacent and parallel to the first leg, an elongated second side member located adjacent and parallel to the third leg and a first plurality of mutually vertically adjacent protective members extending substantially horizontally between the first side member and the second side member, wherein a lateral axis of each protective member of the first plurality of mutually vertically adjacent protective members forms a first included angle with a horizontal plane within a range of 55 to 75 degrees.

Another embodiment of the disclosure includes a barrier comprising a lower portion comprising a first A-frame structure having a first leg and a second leg, a second A-frame structure oriented parallel to and laterally spaced from the first A-frame structure and having a third leg and a fourth leg and a first protective member assembly extending between the first leg and the third leg. The first protective member assembly comprises a first side member, a second side member and a first plurality of protective members oriented at an acute included angle with respect to a horizontal plane and extending substantially horizontally between the first side member and the second side member. The barrier further comprises an upper portion attached to top portions of the first and second A-frames structures of the lower portion of the barrier; the upper portion comprising a first vertical post member, a second vertical post member laterally spaced from and aligned with the first post member and a third protective member assembly extending between the first post member of the upper portion and the second post member of the upper portion.

Another embodiment of the disclosure includes a method of making a barrier, the method comprising forming a first A-frame structure having a first leg and a second leg, forming a second A-frame structure having a third leg and a fourth leg and spaced from the first A-frame structure, and forming a first protective member assembly comprising orienting a lateral axis of each protective member of a first plurality of protective members to form an included angle with a horizontal plane when the first protective member is installed in the barrier within a range of 55 to 75 degrees, securing a first longitudinal end of each protective member of the first plurality of protective members to a first side member such that the angle is maintained, securing a second longitudinal end of each protective member the first plurality of protective members to a second side member and sliding the first protective member assembly into a first guide defined by the first leg of the first A-frame structure and the third leg of the second A-frame structure.

BRIEF DESCRIPTION OF THE DRAWINGS

For a detailed understanding of the present disclosure, reference may be made to the following detailed description, taken in conjunction with the accompanying drawings, in which like elements have generally been designated with like numerals, and wherein:

FIG. 4A is a cross-sectional view of a protective member assembly of a protective barrier according to an embodiment of the present disclosure;

FIG. 4B is a top view of the protective member assembly of FIG. 4A;

FIG. 4C is an enlarged partial top view of a portion of the protective member assembly of FIG. 4B;

FIG. 4D is a frontal view of the protective member assembly of FIG. 4A;

DETAILED DESCRIPTION

Figure 1:
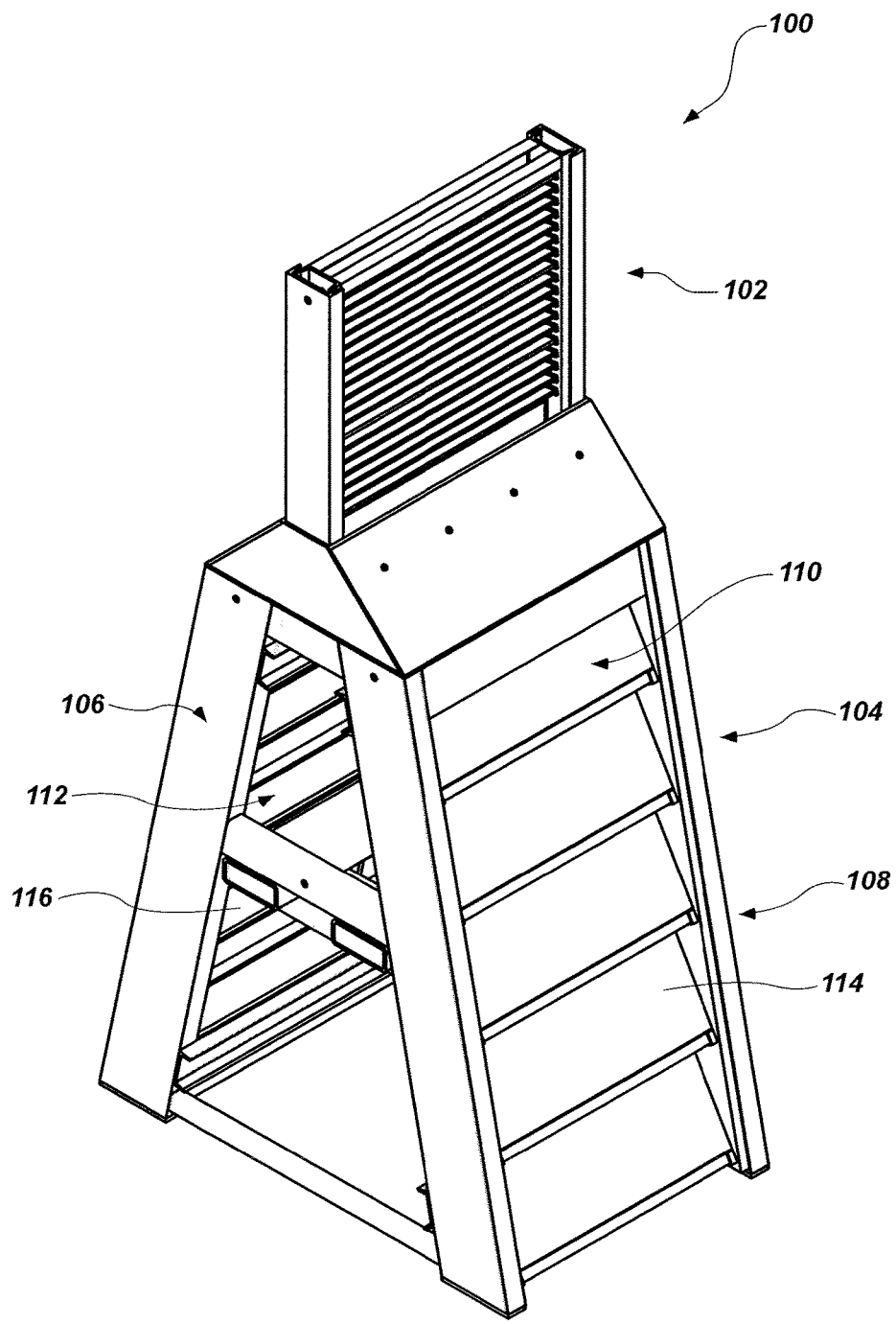
FIG. 1 is a perspective view of a protective barrier according to an embodiment of the present disclosure.

The illustrations presented herein are not actual views of any particular drilling system, drilling tool assembly, or component of such an assembly, but are merely idealized representations which are employed to describe the present invention.

As used herein, any relational term, such as "first," "second," "over," "beneath," "top," "bottom," "underlying," "up," "down," "lower," "upper," etc., is used for clarity and convenience in understanding the disclosure and accompanying drawings, and does not connote or depend on any specific preference, orientation, or order, except where the context clearly indicates otherwise. For example, these terms may refer to an orientation of elements of the protective barrier relative to a surface (e.g., ground, platform, etc.) on which the protective barrier may be positioned (e.g., as illustrated in the figures).

As used herein, the terms "vertical" and "horizontal" may refer to a drawing figure as oriented on the drawing sheet, and are in no way limiting of orientation of an apparatus, or any portion thereof, unless it is apparent that a particular orientation of the apparatus is necessary or desirable for operation in view of gravitational forces. For example, when referring to elements illustrated in the figures, the terms "vertical" or "horizontal" may refer to an orientation of elements of the protective barrier relative to a surface (e.g., ground, platform, etc.) on which the protective barrier may be positioned.

Some embodiments of the present disclosure relate to protective barriers for protecting assets (e.g., electrical power transformers and substations) against ballistic, blast, and vehicular crash threats. The protective barriers may include protective members that are angled from the vertical to encourage deflection of projectiles that may be fired at the protective barriers and protected assets. Furthermore, the protective barriers may not require anchoring to the ground in order to exhibit sufficient stability to withstand projectile or vehicular attacks and/or high wind bursts. For example, the protective barriers may be configured to allow diffusion of substantial volumes of air at high flow rates without causing instability. Furthermore, a center of gravity of the protective barrier may be sufficiently low relative to a horizontal surface upon which the protective barrier may be positioned to provide stability to the protective barrier. Moreover, the protective barriers may be portable and easily repairable on site.

FIG. 1 is a perspective view of a protective barrier 100 for protecting electrical power transformers and substations according to an embodiment of the present disclosure. The protective barrier 100 may include an upper portion 102 and a lower portion 104. The lower portion 104 may include a first A-frame structure 106, a second A-frame structure 108, a first protective member assembly 110, and a second protective member assembly 112. The first protective member assembly 110 may include a first plurality of protective members 114. The second protective member assembly 112 may include a second plurality of protective members 116. The upper portion 102 of the protective barrier 100 may be disposed on and secured to the lower portion 104 of the protective barrier 100. In some embodiments, the upper portion 102 of the protective barrier 100 may be optional and may be attachable and removable from the lower portion 104.

Figure 2A:
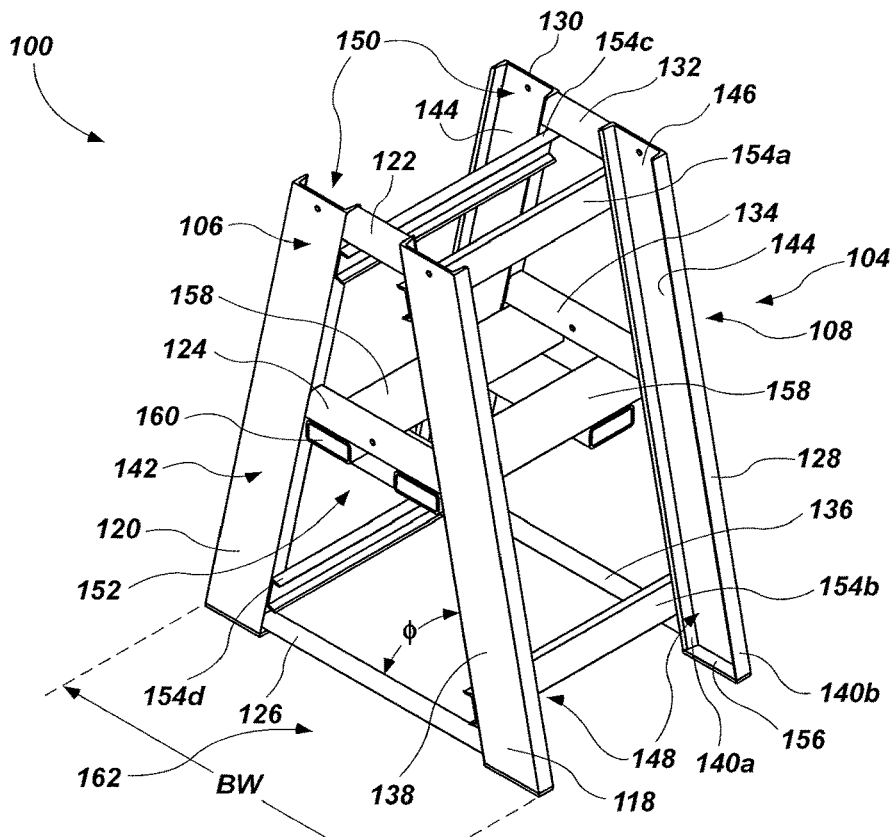
FIG. 2A is a perspective view of a partially assembled lower portion of a protective barrier according to an embodiment of the present disclosure.
Figure 2B:
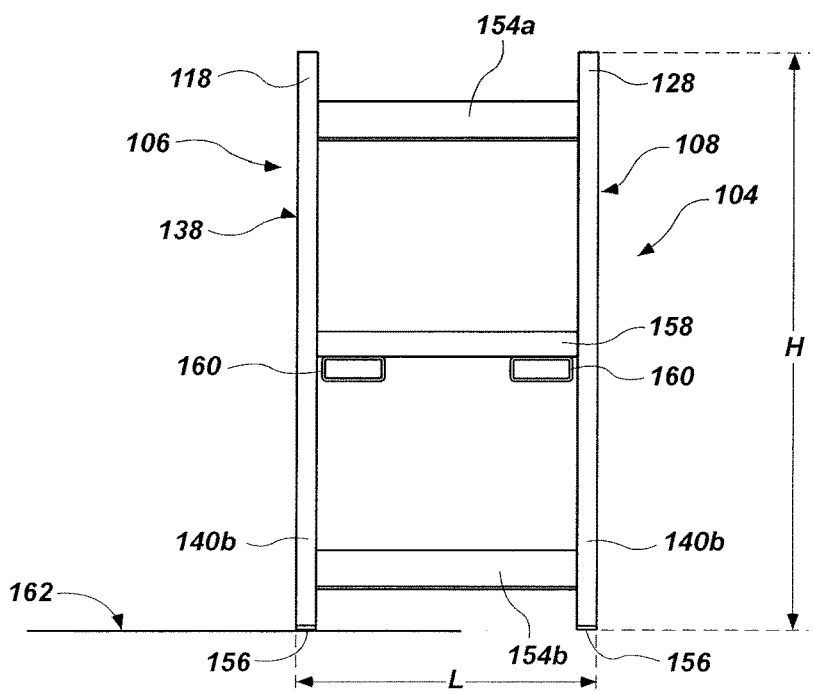
FIG. 2B is a side view of the partially assembled lower portion of the protective barrier of FIG. 2A.

FIG. 2A is a perspective view of the lower portion 104 of the protective barrier 100 with the upper structure and protective member assemblies removed to better show the elements of the lower portion 104. FIG. 2B is a side view of the lower portion 104 of the protective barrier 100 of FIG. 2A. Referring to FIGS. 1, 2A, and 2B together, the first A-frame structure 106 may include a first leg 118, a second leg 120, a first upper cross member 122, a first middle cross member 124, and a first lower cross member 126. The second A-frame structure 108 may include a third leg 128, a fourth leg 130, a second upper cross member 132, a second middle cross member 134, and a second lower cross member 136. The first leg 118 and second leg 120 of the first A-frame structure 106 may be inclined toward one another at an acute included angle. Similarly, the third leg 128 and fourth leg 130 of the second A-frame structure 108 may be inclined toward one another at an acute included angle. In other words, the first leg 118 and second leg 120 of the first A-frame structure 106 and the third leg 128 and fourth leg 130 of the second A-frame structure 108 may form inverted V-structures. Angles of the respective associated legs 118, 120 and 128, 130 with respect to the vertical may be the same, or different. For example, legs positioned on the side of protective barrier 100 facing a power transformer or other substation component may be inclined at a greater angle to the vertical than the associated leg facing away from the substation component to provide greater stability against vehicular assaults.

The first upper cross member 122 of the first A-frame structure 106 may extend from a top section of the first leg 118 to a top section of the second leg 120 in an at least substantially horizontal direction. The second upper cross member 132 of the second A-frame structure 108 may extend from a top section of the third leg 128 to a top section of the fourth leg 130 in an at least substantially horizontal direction. The first middle cross member 124 of the first A-frame structure 106 may extend from a middle section of the first leg 118 to a middle section of the second leg 120 in an at least substantially horizontal direction. The second middle cross member 134 of the second A-frame structure 108 may extend from a middle section of the third leg 128 to a middle section of the fourth leg 130 in an at least substantially horizontal direction. The first lower cross member 126 of the first A-frame structure may extend from a bottom section of the first leg 118 to a bottom section of the second leg 120 in an at least substantially horizontal direction. The second lower cross member 136 of the second A-frame structure may extend from a bottom section of the third leg 128 to a bottom section of the fourth leg 130 in an at least substantially horizontal direction. In some embodiments, the first and second upper cross members 122, 132 and first and second middle cross members 124, 134 may be made from steel tubing having a shape of HSS6×3×½ as classified by the American Institute of Steel Construction ("AISC"). Furthermore, the first and second upper cross members 122, 132 and first and second middle cross members 124, 134 may be made of low carbon steel. For example, in some embodiments the low carbon steel may be A36 steel as classified by the American Society for Testing and Materials ("ASTM"). In some embodiments, the first and second bottom cross members 126, 136 may be made from steel tubing having a shape of HSS3×2×¼ as classified by AISC.

The first A-frame structure 106 may be oriented parallel to the second A-frame structure 108. For example, the first upper cross member 122 of the first A-frame structure 106 may extend in a direction parallel to a direction in which the second upper cross member 132 of the second A-frame structure 108 extends.

In some embodiments, the first and second legs 118, 120 of the first A-frame structure 106 and the third and fourth legs 128, 130 of the second A-frame structure 108 (referred to hereinafter in culmination for ease of explanation as "the legs") may include a C-channel. In some embodiments, the legs may be made from C-channels having a shape of C12×30 as classified by AISC. Furthermore, the legs may be made of low carbon steel. For example, the low carbon steel may be A36 steel as classified by ASTM. Accordingly, each leg may include a base portion 138 and two flanges 140a, 140b extending along a longitudinal length of the leg. The base portion 138 of the leg may have an outer surface 142 and an inner surface 144. The flanges 140a, 140b may extend from the inner surface 144 in a direction normal to the inner surface 144 of the base portion 138 and may define a channel 146 with the inner surface 144 of the base portion 138 of the leg. In some embodiments, the channel of the first leg 118 of the first A-frame structure 106 and the channel 146 of the third leg 128 of the second A-frame structure 108 may face each other. For example, the first leg 118 of the first A-frame structure 106 and the third leg 128 of the second A-frame structure 108 may be oriented such that the inner surface of the first leg 118 of the first A-frame structure 106 faces the inner surface 144 of the third leg 128 of the second A-frame structure 108. In other words, the first leg 118 of the first A-frame structure 106 and the third leg 128 of the second A-frame structure 108 may form a first guide 148 (e.g., within the channel 146 and between the flanges 140a, 140b of the legs) into which the first protective member assembly 110 may be inserted (e.g., slid, placed, etc.). Similarly, the second leg 120 of the first A-frame structure 106 and the fourth leg 130 of the second A-frame structure 108 may form a second guide 150 into which the second protective member assembly 112 may be inserted.

Each leg 118, 120, 128, 130 may include an inner flange 140a and an outer flange 140b. The inner and outer flanges 140a, 140b of the legs may be oriented toward an inside of the A-frame structures. The inside of the each A-frame structure may be characterized as an area between the legs of the first A-frame structure 106 and second A-frame 108. In other words, the first upper cross member 122, the first middle cross member 124, and the first lower cross member 126 may extend from an inner flange 140a of the first leg 118 of the first A-frame structure 106 to an inner flange 140a of the second leg 120 of the first A-frame structure 106. The outer flange 140b of each leg 118, 120, 128, 130 may be on a side of the base portion 138 of the legs opposite the inner flange 140a.

In some embodiments, the lower portion 104 of the protective barrier 100 may further include a center support structure 152, a plurality of support members 154, and a plurality of base plates 156. The center support structure 152 may be attached to the first and second middle cross members 124, 134 of the first and second A-frame structures 106, 108. The center support structure 152 may include two upper members 158 and two lower members 160. The two upper members 158 may be attached to bottom surfaces of the first and second middle cross members 124, 134 of the first and second A-frame structures 106, 108 and may extend from the first middle cross member 124 of the first A-frame structure 106 to the second middle cross member 134 of the second A-frame structure 108. The two upper members 158 may also extend in directions perpendicular to longitudinal lengths of the first and second middle cross members 124, 134. Furthermore, the two upper members 158 may extend in a horizontal direction. In some embodiments, one of the two upper members 158 may be located adjacent to the inner flanges 140a, 140b of the second and fourth legs 120, 130 of the first and second A-frame structures 106, 108, respectively. In some embodiments, the other of the two upper members 158 may be oriented adjacent to the inner flanges 140a, 140b of the first and third legs 118, 128 of the first and second A-frame structures 106, 108, respectively. The two lower members 160 of the center support structure 152 may be attached to bottom surfaces of the two upper members 158 and may extend in directions perpendicular to longitudinal lengths of the two upper members 158. In some embodiments, the two upper members 158 and the two lower members 160 of the center support structure 152 may be made from steel tubing having a shape of HSS 10×4×½ as classified by AISC. Furthermore, in some embodiments, the two upper members 158 and the two lower members 160 of the center support structure 152 may be made of low carbon steel. For example, the low carbon steel may be A36 steel as classified by ASTM.

The plurality of support members 154 of the lower portion 104 of the protective barrier 100 may extend between the first A-frame structure 106 and the second A-frame structure 108. In some embodiments, the plurality of support members 154 of the lower portion 104 may include a first support member 154a, a second support member 154b, a third support member 154c, and a fourth support member 154d. The first support member 154a may extend from first leg 118 of the first A-frame structure 106 to the third leg 128 of the second A-frame structure 108 on the inside of the first and second A-frame structures 106, 108 (e.g., adjacent to inner flanges 140a of the legs), in an at least substantially horizontal direction, and at least substantially immediately below the first and second upper cross members 122, 132 of the first and second A-frame structures 106, 108. The second support member 154b may extend from first leg 118 of the first A-frame structure 106 to the third leg 128 of the second A-frame structure 108 on the inside of the first and second A-frame structures 106, 108 (e.g., adjacent to inner flanges 140a of the legs), in an at least substantially horizontal direction, and at least substantially immediately above the first and second lower cross members 126, 136 of the first and second A-frame structures 106, 108. The third support member 154c may extend from second leg 120 of the first A-frame structure 106 to the fourth leg 130 of the second A-frame structure 108 on the inside of the first and second A-frame structures 106, 108 (e.g., adjacent to inner flanges 140a of the legs), in an at least substantially horizontal direction, and at least substantially immediately below the first and second upper cross members 122, 132 of the first and second A-frame structures 106, 108. The fourth support member 154d may extend from second leg 120 of the first A-frame structures 106 to the fourth leg 130 of the second A-frame structure 108 on the inside of the first and second A-frame structures 106, 108 (e.g., adjacent to inner flanges 140a of the legs), in an at least substantially horizontal direction, and at least substantially immediately above the first and second lower cross members 126, 136 of the first and second A-frame structures 106, 108. In some embodiments, the plurality of support members 154 may be attached to the legs of the first and second A-frame structures 106, 108 through welds and/or fasteners, for example, bolts. In some embodiments, each support member of the plurality of support members 154 may be made of steel C-channels having a shape of C6×13 as classified by AISC. Furthermore, the plurality of support members 154 may be made of low carbon steel. For example, the low carbon steel may be A36 steel as classified by ASTM.

The plurality of base plates 156 may be attached to the legs of the first and second A-frame structures 106, 108. For example, a base plate 156 may be attached to each of the legs of the first and second A-frame structures 106, 108. In some embodiments, the base plate 156 may extend from the inner flange 140a to the outer flange 140b of a respective leg 118, 120, 128, 130 and along the inner surface 144 of the respective leg. The base plates 156 may serve as a stop for the first and second protective member assemblies 110, 112 when the first and second protective member assemblies 110, 112 are inserted into the first and second guides 148, 150 formed by the legs 118, 120, 128, 130 of the first and second A-frame structures 106, 108. Furthermore, attaching the base plate 156 to the bottom of a leg 118, 120, 128, 130 may give the leg 118, 120, 128, 130a rectangular base and may assist in keep the protective barrier 100 from sinking into a surface upon which the protective barrier 100 may be situated. For example, if the protective barrier 100 were situation on a relatively soft surface (e.g., dirt, grass, etc.), the plurality of base plates 156 may at least partially prevent the protective barrier 100 from sinking into the surface. In some embodiments, the base plates 156 may be welded to the bottoms of the legs. In some embodiments, the base plates 156 may be made from 0.63 inch (⅝") thick steel plates. Furthermore, the base plates 156 may be made of low carbon steel. For example, the low carbon steel may be A36 steel as classified by ASTM.

The lower portion 104 of the protective barrier 100 may have a length L (e.g., distance from the outer surface 142 of first leg 118 of the first A-frame structure 106 to the outer surface 142 of the third leg 128 of the second A-frame structure 108). In some embodiments, the length L may be within a range of 40 to 60 inches. In some embodiments, the length L may be within a range of 45 to 55 inches. For example, the length L may be at least about 48 inches.

The lower portion 104 of the protective barrier 100 may have a base width BW (e.g., a distance from an outermost edge of the first leg 118 at a base of the first A-frame structure 106 to an outermost edge of the second leg 120 at the base of the first A-frame structure 106). In some embodiments, the base width BW may be within a range of 65 to 85 inches. In some embodiments, the base width BW may be within a range of 70 to 80 inches. For example, the base width BW may be at least about 75 inches.

The lower portion 104 of protective barrier 100 may have a height H (e.g., a distance from a lowermost surface of the first and second A-frame structures 106, 108 to an uppermost surface of the first and second A-frame structures 106, 108) (also referred to herein as "overall height H"). In some embodiments, the height H may be within a range of 80 to 100 inches. In some embodiments, the height H may be within a range of 85 to 95 inches. For example, the height H may be at least about 93 inches.

In some embodiments, as noted above, the legs of the first and second A-frame structures 106, 108 may be inclined relative to a horizontal surface 162 (e.g., ground on which protective barrier 100 may be situated) (also referred to herein as "horizontal plane"). For example, longitudinal axes of the legs of the first and second A-frame structures 106, 108 may form an included angle $\phi$ with the horizontal plane 162. In some embodiments, the angle $\phi$ may be within a range of 65° to 85°. In some embodiments, the angle $\phi$ may be within a range of 70° to 80°. For example, the angle $\phi$ may be at least about 78°.

Figure 3A:
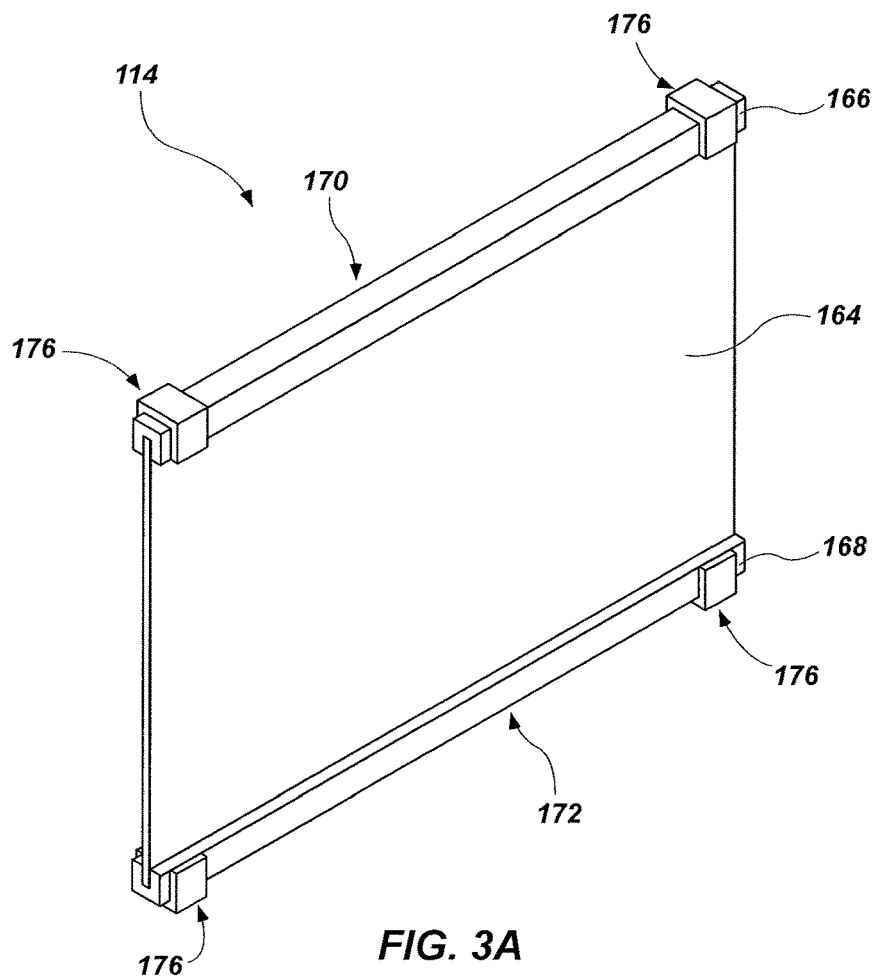
FIG. 3A is a perspective view of a protective member of a protective barrier according to an embodiment of the present disclosure.
Figure 3B:
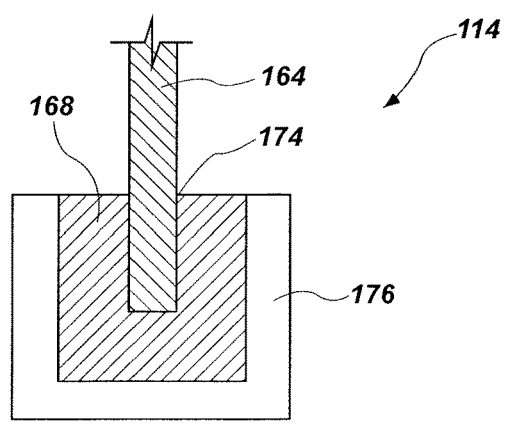
FIG. 3B is a partial cross-sectional view of the protective member of FIG. 3A.

FIG. 3A is a perspective view of a protective member 114 of the protective barrier 100 (FIG. 1) according to an embodiment of the present disclosure. The protective member 114 may include a plate 164, a first frame member 166, and a second frame member 168. The first frame member 166 may be attached to a first lateral end 170 of the plate 164, and the second frame member 168 may be attached to a second lateral end 172 of the plate 164. The first and second frame members 166, 168 may extend along the lengths of the first and second lateral ends, 170, 172, respectively. FIG. 3B is a partial cross-sectional view of a lateral end of the plate 164 and a frame member of the protective member 114. Referring to FIGS. 3A and 3B together, in some embodiments, the first and second frame members 166, 168 may have rectangular cross sections. Furthermore, each of the first and second frame members 166, 168 may include a recess 174 defined in one side thereof, and the plate 164 may be fitted into the recesses 174 of the first and second frame members 166, 168. In some embodiments, the plate 164 may be press fitted into recesses 174 of the first and second frame members 166, 168. In some embodiments, the recesses 174 may be formed having a width that is smaller than a thickness of the plate 164, and the plate 164 may be hydraulically pressed into the recess 174 to provide an interference fit. For example, the recesses 174 may be formed 0.007 inch smaller than a thickness of the plate 164.

In some embodiments, the recesses 174 may have a depth within a range of 0.5 inch (½") to 1.25 inch (1¼"). In some embodiments, the recesses 174 may have a depth within a range of 0.75 inch (¾") to 1.0 inch (1"). For example, in some embodiments, the recesses 174 may a depth of at least about 0.94 inch (15/16"). In some embodiments, the press fitting of the plate 164 into the first and second frame members 166, 168 may provide additional support to the plate 164. For example, press fitting the plate 164 into the first and second frame members 166, 168 may reduce a likelihood that the plate 164 will deform when struck with a projectile (e.g., a round of ammunition). In some embodiments, the plates 164 of the protective members 114 may have longitudinal lengths within a range of 40 to 50 inches. In some embodiments, the plates 164 may have longitudinal lengths within a range of 43 to 47 inches. For example, the plates 164 may have longitudinal lengths of at least about 45 inches. In some embodiments, the plates 164 of the protective members 114 may have lateral lengths within a range of 15 to 25 inches. In some embodiments, the plates 164 may have longitudinal lengths within a range of 20 to 23 inches.

For example, the plates 164 may have lateral lengths of at least about 21.625 inches (21⅝").

In some embodiments, the plates 164 of the protective members 114 may be made of 0.44 inch (7/16") to 0.50 inch (½") thick plates. Furthermore, the plates 164 may be MIL-DTL-46100 tempered high-hardness wrought steel armor plates as classified by Department of Defense. In some embodiments, the first and second frame members 166, 168 may be formed from a 1.5 inch by 1.5 inch (1.5"×1.5") square bar having recess 174 machined therein. Furthermore, the first and second frame members 166, 168 may be made of low carbon steel. For example, in some embodiments the low carbon steel may be A36 steel as classified by the ASTM.

In some embodiments, the protective members 114 may include at least one shock absorber 176. In some embodiments, shock absorbers 176 may wrap around portions of the first and second frame members 166, 168 of the protective member 114. For example, when the first and second frame members 166, 168 have rectangular cross-sections, the shock absorber 176 may wrap around the three sides of the first and second frame members 166, 168 that do not have the recesses 174 defined therein. In other embodiments, the shock absorber 176 may also wrap around any exposed portions of the sides of the first and second frame members 166, 168 that do have the recesses 174 defined therein. In some embodiments, the shock absorber 176 may include a rubber material. For example, the shock absorber 176 may be made of one or more of Nitrile, Ethylene-Propylene, Fluorocarbon, Chloroprene, Silicone, Fluorosilicone, Polyacrylate, Ethylene Acrylic, Styrene-butadiene, Polyurethane, and Natural rubber. In some embodiments, the shock absorber 176 made be made of Linagard BB manufactured by Linatex Corporation of America. In some embodiments, a thickness of the shock absorber 176 may be within a range of 0.13 inch (⅛") to 0.50 inch (½"). For example, a thickness of the shock absorber 176 may be at least about 0.25 inch (¼").

FIG. 4A is a cross-sectional view of a protective member assembly 110 of the lower portion 104 of the protective barrier 100 (FIG. 1). FIG. 4B is a top side view of the protective member assembly 110 of FIG. 4A. FIG. 4C is an enlarged partial top side view of a portion of the protective member assembly 110 of FIG. 4B. FIG. 4D is a frontal view of the protective member assembly 110 of FIG. 4A. Referring to FIGS. 4A-4D in combination, each protective member assembly of the first and second protective member assemblies 110, 112 (referred to herein in reference to FIGS. 4A-4D for ease of explanation as "protective member assembly 110") may include a first side member 178, a second side member 180, a plurality of protective members 114, a top support member 182, and a bottom support member 184.

The first side member 178 may be oriented parallel to the second side member 180 (e.g., a longitudinal axis of the first side member 178 may be parallel to a longitudinal axis of the second side member 180), and the plurality of protective members 114 may extend between the first side member 178 and the second side member 180. Both the first side member 178 and the second side member 180 may include a C-channel. In some embodiments, the first and second side members 178, 180 may be made of C-channels having a shape of C10×25 as classified by AISC. Furthermore, the first and second side members 178, 180 may be made of low carbon steel. For example, in some embodiments the low carbon steel may be A36 steel as classified by the ASTM. Each of the first and second side members 178, 180 may include a base portion 186 and two flanges 188 extending along longitudinal lengths of the first and second side members 178, 180. The base portions 186 of the first and second side members 178, 180 may each have an outer surface 190 and an inner surface 192, and the flanges 188 may extend from the inner surfaces 192 of the base portions 186 in directions normal to the inner surfaces 192 of the base portions 186 and may define channels 194 with the inner surfaces 192 of the base portions 186 of the first and second side members 178, 180. The first and second side members 178, 180 may be oriented opposite to each other. In other words, the channels of the first side member 178 and the second side member 180 may be facing away from each other. Stated another way, the outer surface 190 of the first side member 178 may face the outer surface 190 of the second side member 180.

The top support member 182 of the protective member assembly 110 may extend from the outer surface 190 of the first side member 178 to the outer surface 190 of the second side member 180 proximate a top of the first and second side members 178, 180. The top support member 182 may extend in a direction at least substantially perpendicular to the longitudinal axes of first side member 178 and the second side member 180 of the protective member assembly 110. The bottom support member 184 may extend from an outer surface 190 of the first side member 178 to the outer surface 190 of the second side member 180 proximate a bottom of the first and second side members 178, 180. The bottom support member 184 may extend in a direction at least substantially perpendicular to the longitudinal axes of first side member 178 and the second side member 180 of the protective member assembly 110.

The first and second side members 178, 180 may each have a plurality of slots 196 formed therein. For example, the plurality of slots 196 may extend through the base portions 186 of the first and second side members 178, 180. The slots 196 of the plurality of slots 196 may be sized and shape to receive a longitudinal end of a protective member 114. For every protective member 114 included in the protective member assembly 110, there may be a slot 196 in the first side member 178 for receiving a first longitudinal end of the protective member 114 and another, mutually aligned slot 196 in the second side member 180 for receiving a second longitudinal end of the protective member 114. The slots 196 of the plurality of slots 196 formed in a respective side member may be oriented parallel to the each other. In other words, the longitudinal axes of the slots 196 of the plurality of slots 196 may be parallel to each other.

In some embodiments, the slots 196 of the plurality of slots 196 may have a width within a range of 1.25 inches (1¼") to 2.75 inches (2¾"). In some embodiments, the slots 196 of the plurality of slots 196 may have a width within a range of 1.75 inches (1¾") to 2.25 inches (2¼"). For example, the slots 196 of the plurality of slots 196 may have a width of 2.0 inches. In some embodiments, the slots 196 of the plurality of slots 196 may have a length within a range of 15 inches to 30 inches. In some embodiments, the slots 196 of the plurality of slots 196 may have a length within a range of 20 inches to 25 inches. For example, the slots 196 of the plurality of slots 196 may have a length of 23.25 inches (23¼").

Each slot 196 of the plurality of slots 196 may be inclined relative to the horizontal surface 162 upon which the protective barrier 100 may be placed, and in a same direction as the first and second side members 178, 180 are inclined. In other words, the slots 196 of the plurality of slots 196 may be defined such that a longitudinal axis of each slot 196 of the plurality of slots 196 forms an included angle β with the horizontal plane 162 when the protective barrier 100 rests on a supporting surface. In some embodiments, the angle β may be within a range of 50° to 70°. In some embodiments, the angle β may be within a range of 55° to 65°. For example, the angle β may be at least about 60°. Accordingly, the plurality of protective members 114 that may be inserted into the plurality of slots 196 may be oriented at the same angle β relative to the horizontal plane 162 when inserted into the plurality of slots 196. Having the plurality of protective members 114 oriented at the angle β relative to the horizontal plane 162 may encourage projectiles (e.g., rounds of ammunition) that may strike the protective members 114 to ricochet off of the protective members 114 instead of embedding into the protective members 114 and/or penetrating the protective members 114. For example, having the plurality of protective members 114 oriented at the angle β of at least about 75° relative to the horizontal plane 162 may increase a probability that projectiles striking the protective members 114 will ricochet off of the protective members 114. Thus, having the protective members 114 oriented at an angle β relative to the horizontal plane 162 may help to preserve the protective members 114 and may help to reduce damage experienced by the protective members 114 when stopping and/or deflecting projectiles that may be fired at an asset which the protective members 114 of protective barrier 100 are positioned to protect.

Each slot 196 of the plurality of slots 196 may have a lower end 198 and an upper end 200. Furthermore, the plurality of slots 196 may be oriented relative to each other such that a lower end 198 of a first slot 196 of the plurality of slots 196 extends lower vertically than an upper end 200 of an adjacent second slot 196 that is below the first slot 196, wherein mutually vertically adjacent slots are positioned in partially overlapping relationship. Moreover, an upper end 200 of the first slot 196 of the plurality of slots 196 may extend higher vertically than a lower end 198 of an adjacent third slot 196 that is above the first slot 196. Thus, when the plurality of protective members 114 are inserted into the plurality of slots 196, each of the plurality of protective members 114 may partially vertically overlap one or more vertically adjacent protective members 114. In other words, a first protective member 114 that is above a second protective member 114 may at least partially overhang the second protective member 114. Stated another way, a lower lateral end of the first protective member 114 may extend lower vertically than an upper lateral end of the second protective member 114. As a result, when the protective barrier 100 is viewed in a horizontal direction, as depicted in FIG. 4D, there may not be any vertical gaps between adjacent protective members 114 of the plurality of protective members 114 of the protective member assembly 110. In some embodiments, a distance the first protective member 114 may overhang the second protective member 114 may be at least equal to a diameter of a round of ammunition the protective barrier 100 is intended and/or anticipated to stop or deflect. For example, the protective members 114 may overhang each other by a distance measured vertically of at least about 0.22 inch (e.g., diameter of a .22 caliber round). In some embodiments, the protective members 114 may overhang each other by a distance of at least about 0.308 inch (e.g., diameter of a .30-06 round). In some embodiments, the protective members 114 may overhang each other by a distance of at least about 0.50 inch (e.g., diameter of a .50 caliber round). In some embodiments, the plates 164 of the protective members 114 may overhang each other by the distance listed above. Thus, projectiles (e.g., rounds) that are traveling toward the protective members 114 in horizontal directions or at a decline would not be able to pass through the protective member assembly 110 without striking at least one of the plates 164 of the plurality of protective members 114 of the protective member assembly 110. Furthermore, for projectiles traveling toward the plurality of protective members 114 at an incline, the projectiles would have to be traveling upwardly in a direction that is at least about the same angle at which the protective members 114 are inclined relative to the horizontal plane 162 in order to pass through the protective member assembly 110 without striking at least one of the protective members 114. As a result, if the projectiles are traveling at a sufficient upward incline to travel through the protective member assembly 110 without striking a protective member 114, the projectiles would almost necessarily miss any asset the protective barrier 100 is positioned to protect.

In some embodiments, the lower ends 198 of the plurality of slots 196 may be spaced at least some distance horizontally from the upper ends 200 of adjacent slots 196 of the plurality of slots 196. Accordingly, the lower lateral ends of the plurality of protective members 114 may be spaced at least some distance horizontally from the upper lateral ends of adjacent protective members 114 of the plurality of protective members 114. Having horizontal spaces between adjacent protective members 114 of the plurality of protective members 114 may allow for air diffusion through the protective barrier 100. Allowing air diffusion through the protective barrier 100 may reduce adverse consequences of wind forces experienced by the protective barrier 100, and thus, may reduce chances that the protective barrier 100 will be moved, tipped over, and/or damaged by high winds. Furthermore, allowing air diffusion through the protective barrier 100 may, in some instances, increase stability of the protective barrier 100 by applying a downward force.

As shown in FIG. 4A, when the plurality of protective members 114 is inserted into the slots 196, the shock absorbers 176 of the protective members 114 may press against interior edges of the plurality of slots 196. The shock absorbers 176 may be used to suspend the plates 164 and first and second frame members 166, 168 of the plurality of protective members 114, and the plates 164 and first and second frame members 166, 168 of the plurality of protective members 114 may not contact the interior edges of the plurality of slots 196. The shock absorbers 176 may assist in maintaining integrity of the protective barrier 100 and preventing or reducing damage to the protective barrier 100. For example, the shock absorbers 176 may absorb at least some of an impact (e.g., provide cushion) when a projectile strikes a protective member 114 of the plurality of protective members 114, reducing the likelihood that a plate 164 of a protective member 114 will be penetrated, even by a high velocity, high caliber projectile. Furthermore, the shock absorbers 176 may reduce a likelihood that a protective member 114 will deform to absorb an impact of a projectile as the shock absorbers 176 will absorb at least a portion of the impact. As shown in FIG. 4C, in some embodiments, the shock absorbers 176 may extend only along portions of the first and second frame members 166, 168 of the plurality of protective members 114 that are inserted into the plurality of slots 196. Although, the first and second protective member assemblies 110, 112 are referred to herein in regard to FIGS. 4A-4D as singular for ease of explanation, it is understood that first protective member assembly 110 includes a first side member 178, a second side member 180, and a first plurality of protective members 114 installed in a plurality of slots 196, and the second protective member assembly 112 includes a first side member 178, a second side member 180, a second plurality of protective members 114 installed in a plurality of slots 196. Furthermore, in some embodiments, the structural configuration of the second protective member assembly 112 may be the same as the structural configuration of the first protective member assembly 110.

Figure 5A:
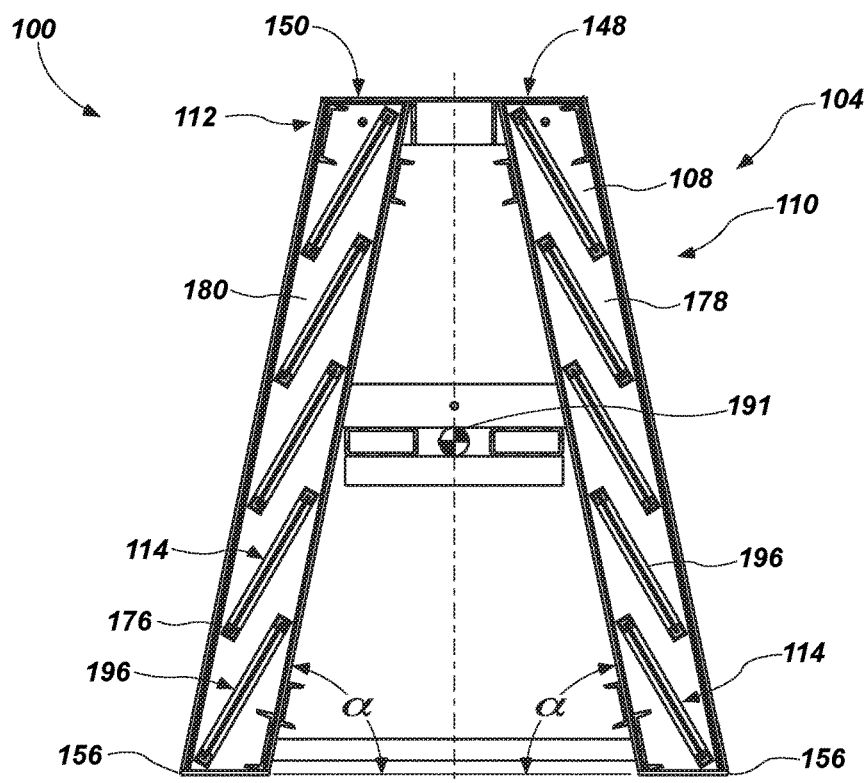
FIG. 5A is a cutaway sectional view of the lower portion of a protective barrier according to an embodiment of the present disclosure.
Figure 5B:
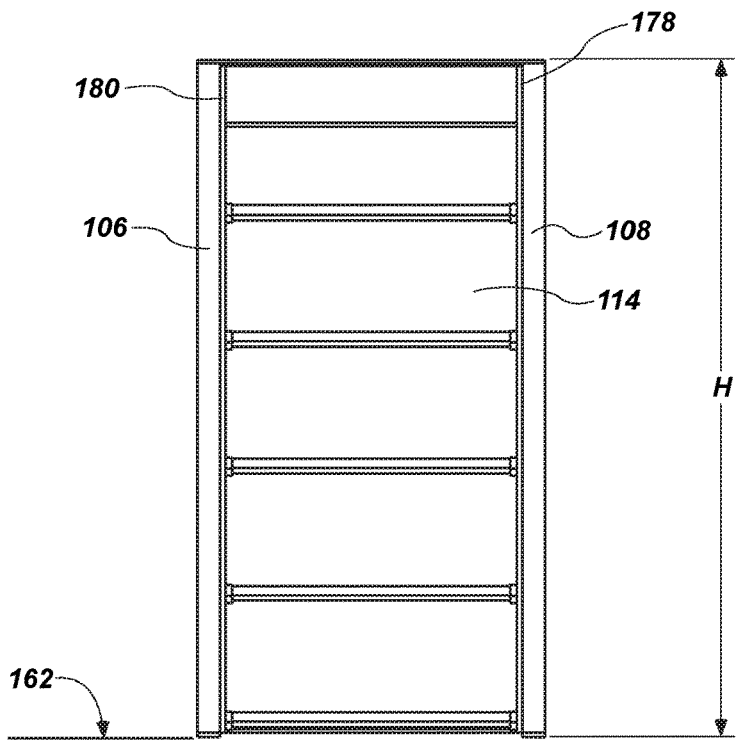
FIG. 5B is a frontal view of the lower portion of FIG. 5A.

FIG. 5A is a cross-sectional view of the lower portion 104 of the protective barrier 100 including the first and second protective member assemblies 110, 112. FIG. 5B is a front side view of the lower portion 104 of FIG. 5A. Referring to FIGS. 5A and 5B together, the first and second protective member assemblies 110, 112 may be inserted into the first and second guides 148, 150 defined by the mutually aligned legs of the first and second A-frame structures 106, 108. When inserted into the first and second guides 148, 150 defined by the legs of the first and second A-frame structures 106, 108, the first and second protective member assemblies 110, 112 may rest upon the base plates 156 of the lower portion 104 of the protective barrier 100.

In some embodiments, the elements and structure (e.g., angles of members, weight of members, orientation of members, etc.) of the lower portion 104 of the protective barrier 100 may result in a center of gravity 191 of the lower portion 104 being located at a distance from the horizontal surface 162 which is equal to or less than an overall height H of the lower portion 104. For example, the lower portion 104 of protective barrier 100 may have a center of gravity 191 that is located a distance of at least about 46.5 inches from the horizontal surface 162 upon which the protective barrier 100 may be positioned and the overall height may be at least about 93.0 inches. Having a relatively low center of gravity 191 (e.g., around or below half the overall height of lower portion 104 of the protective barrier 100), may provide additional stability to the protective barrier 100. For example, unlike convention barriers used in the industry to protect assets, the protective barrier 100 of the present disclosure may not require anchors in the ground in order to maintain a position relative to an asset and/or to prevent the protective barrier 100 from tipping over when subjected to wind and/or projectiles.

When the first and second protective member assemblies 110, 112 are inserted into the first and second guides 148, 150, respectively, defined by the mutually aligned legs of the first and second A-frame structures 106, 108, longitudinal axes of the first and second side members 178, 180 of each of the first protective member assembly 110 and of the second protective member assembly 112 may form an included angle α with the horizontal plane 162 (e.g., ground upon which protective barrier 100 may be situated). In some embodiments, the angle α may be within a range of 65° to 85°. In some embodiments, the angle α may be within a range of 70° to 80°. For example, the angle α may be at least about 78°.

Referring again to FIG. 5A, having a first protective member assembly 110 and a second protective member assembly 112 provides two layers of protection (e.g., armor) against any projectile that may strike the protective barrier 100. Furthermore, having the first protective member assembly 110 spaced at least some distance from the second protective member assembly 112 allows the protective barrier 100 to utilize any airspace between the first protective member assembly 110 and the second protective member assembly 112 to reduce a velocity of a projectile striking the protective barrier 100. For example, any projectile that might pierce a protective member 114 of the plurality of the protective members 114 of the first protective member assembly 110 may become fractured while traveling through and exiting the protective member 114. Any fractured pieces of the projectile will likely tumble through the air space between the first protective member assembly 110 and the second protective member assembly 112 and lose velocity while traveling through the air space. Thus, when the fractured pieces of the projectiles strike a protective member 116 of the second plurality of the protective members 116 of the second protective member assembly 112, the fractured pieces will likely not have a sufficient velocity to pierce or damage the protective member 116 of the second plurality of protective members 116, and will be deflected downwardly due to the angle of plates 164 of the second protective member assembly 112.

Because each of the first and second protective member assemblies 110, 112 are insertable (e.g., slidable) into the first and second guides 148, 150 formed by the legs of the first and second A-frame structures 106, 108, the first and second protective member assemblies 110, 112 may be quickly and easily repaired. For example, when a protective member assembly 110 of the protective barrier 100 becomes damaged, a user may simply slide the damaged protective member assembly out of the respective guide and insert another, replacement protective member assembly 110 into the respective guide. Furthermore, because the protective members 114 are suspended by the shock absorbers 176 within the plurality of slots 196 of the side members, individual protective members 114 may be quickly and easily replaced after removing the respective protective member assembly 110 from the respective guides 148, 150 by sliding the damaged protective member 114 out of its respective slots 196 and sliding a replacement protective member 114 into the slots. Thus, the protective barrier 100 of the present disclosure may provide advantages over known protective barriers, as the protective barrier 100 of the present disclosure may be repaired on site with common tools and little to no on site welding. Furthermore, because the protective barrier 100 can be easily disassembled, the protective barrier 100 may be portable and relatively easy to move in comparison to known protective barriers.

Live-fire ballistic testing performed by the inventor has shown that the first and second protective member assemblies 110, 112, when inserted into the first and second guides 148, 150 and having protective members 114, 116 with a thickness within the range of 0.44 inch (7/16") to 0.50 inch (½") and being angled at least about 60° relative to a horizontal plane, are able to withstand .50 caliber armor piercing ammunition.

Figure 6A:
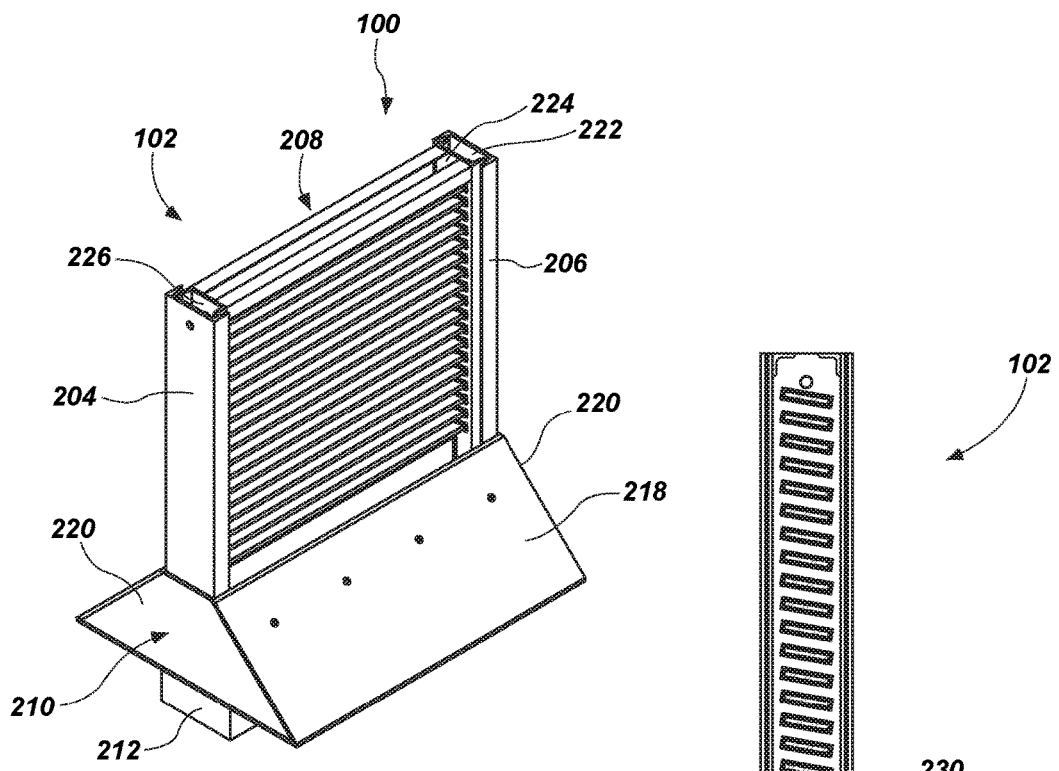
FIG. 6A is a perspective view of the upper portion of a protective barrier according to an embodiment of the present disclosure.
Figure 6B:
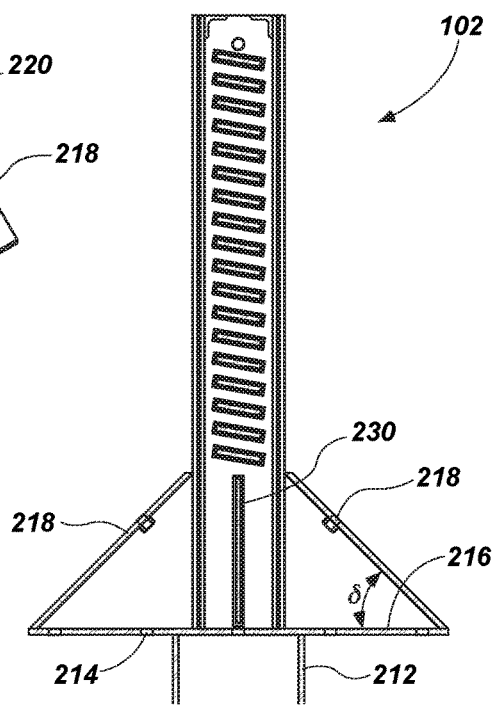
FIG. 6B is a cutaway sectional view of the upper portion of FIG. 6A.
Figure 6C:
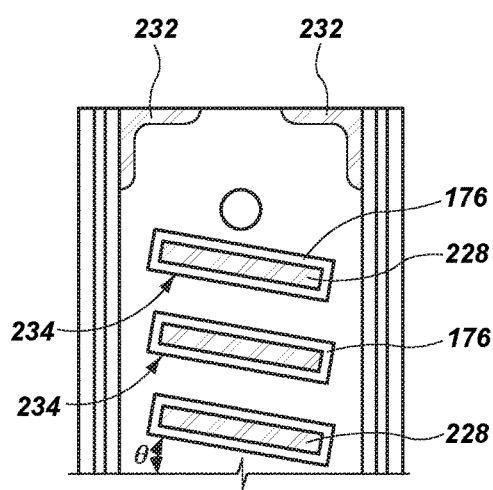
FIG. 6C is an enlarged partial cross-sectional view of the upper portion of FIG. 6A.
Figure 6D:
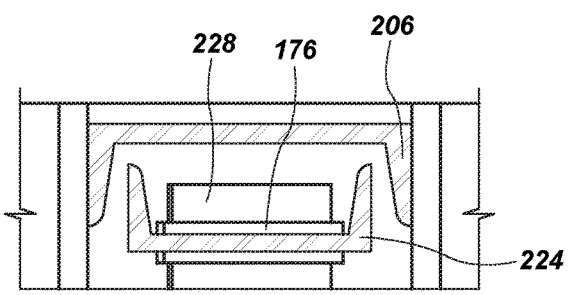
FIG. 6D is an enlarged partial top side view of the upper portion of FIG. 6A.

FIG. 6A is a perspective view of the upper portion 102 of the protective barrier 100 according to an embodiment of the present disclosure. FIG. 6B is a cutaway sectional view of the upper portion 102 of FIG. 6A. FIG. 6C is an enlarged partial cross-sectional view of the upper portion 102 of FIG. 6B. FIG. 6D is a partial top side view of the upper portion 102 of FIG. 6A. Referring to FIGS. 6A-6D together, the upper portion 102 may include a first post member 204, a second post member 206, a third protective member assembly 208, inclined base portion 210 having inclined opposing sides 218, and an attachment portion 212.

The attachment portion 212 of the upper portion 102 of the protective barrier 100 may include a rectangular member 214 that is insertable between the first and second upper cross members 122, 132 (FIG. 2A) of the first and second A-frame structures 106, 108 (FIG. 2A) of the lower portion 104 (FIG. 2A) of the protective barrier 100. The attachment portion 212 may further be attachable to the lower portion 104 (FIG. 2A) of the protective barrier 100. For example, the attachment portion 212 may be attached to the lower portion 104 with at least one fastener (e.g., nuts and bolts). In some embodiments, the attachment portion 212 may be made of 0.5 inch (½") thick steel plates. Furthermore, the attachment portion 212 may be made of low carbon steel. For example, in some embodiments the low carbon steel may be A36 steel as classified by the ASTM.

The base portion 210 may include a bottom plate 216, two inclined plates 218, and two side plates 220. The bottom plate 216 may be attached to a top of the attachment portion 212 of the upper portion 102 of the protective barrier 100, as with fasteners or by a weldment. When the upper portion 102 of the protective barrier 100 is attached to the lower portion 104, a top surface the bottom plate 216 may extend in an at least substantially horizontal plane. The two inclined plates 218 may extend upwardly from opposite lateral edges of the bottom plate 216 toward each other. For example, a cross-section of the bottom plate 216 and two inclined plates 218 may form a bottom portion of a truncated triangle shape. A lateral axis of each of the inclined plates 218 may form an included angle δ with the top surface of the bottom plate 216. In some embodiments, the angle may be at least about 45°. The two side plates 220 may extend from opposite longitudinal ends of the bottom plate 216 in directions at least substantially perpendicular to the top surface of the bottom plate 216 of the base portion 210. For example, the two side plates 220 may extend in direction at least generally upward from the bottom plate 216. The two inclined plates 218 and two side plates 220 may, in combination, define a rectangular hole above the bottom plate 216 of the base portion 210. In some embodiments, the base portion 210 may be fabricated of 0.5 inch (½") thick steel plates. Furthermore, the base portion 210 may be made of low carbon steel. For example, in some embodiments the low carbon steel may be A36 steel as classified by the ASTM. The inclined portion 210 of the upper portion 102 of the protective barrier 100 may make it more difficult for a person to scale the protective barrier 100 (e.g., climb over the protective barrier 100).

The first post member 204 and second post member 206 may extend upwardly from opposite longitudinal ends of the rectangular hole defined by the two inclined plates 218 and two side plates 220 of the base portion 210. In other words, the first post member 204 and second post member 206 may protrude from opposite longitudinal ends of the rectangular hole. The first post member 204 and second post member 206 may each be attached to at least one of the bottom plate 216 and a side plate 220 of the base portion 210 and may extend in directions normal to the top surface of the bottom plate 216 of the inclined portion 210. Each of the first post member 204 and second post member 206 may be made of C-channels having a shape of C8×18.75. Furthermore, the first and second post members 204, 206 may be made of low carbon steel. For example, in some embodiments the low carbon steel may be A36 steel as classified by ASTM. The first post member 204 and the second post member 206 may form a third guide 222 (e.g., within the channel and between the flanges of each of the post members 204, 206) into which the third protective member assembly 208 may be inserted (e.g., slid, placed, etc.).

The third protective member assembly 208 may include a fifth side member 224, a sixth side member 226, a third plurality of protective members 228, a vertical protective plate 230, and two upper support members 232. The fifth side member 224 may be oriented parallel to the sixth side member 226 (e.g., a longitudinal axis of the fifth side member 224 may be parallel to a longitudinal axis of the sixth side member 226); the third plurality of protective members 228 may extend between the fifth side member 224 and the sixth side member 226. Both the fifth side member 224 and the sixth side member 226 may include a C-channel. In some embodiments, both the fifth and sixth side members 224, 226 may be made of C-channels having a shape of C6×13 as classified by AISC. Furthermore, the fifth and sixth side members 224, 226 may be made of low carbon steel. For example, in some embodiments the low carbon steel may be A36 steel as classified by the ASTM.

Because the fifth and sixth side members 224, 226 may be made of C-channels, each of the fifth and sixth side members 224, 226 may have a base portion and two flanges. The base portions of the fifth and sixth side members 224, 226 may each have an outer surface and an inner surface. The flanges of each of the fifth and sixth side members 224, 226 may extend from the inner surface of the base portion in a direction normal to the inner surface of the base portion. Furthermore, the flanges of each of the fifth and sixth side members 224, 226 may define a channel with the inner surface of the base portion of each of the fifth and sixth side members 224, 226. The fifth and sixth side members 224, 226 may be oriented opposite each other. In other words, the channels of the fifth side member 224 and the sixth side member 226 may be facing away from each other. Put another way, the outer surface of the fifth side member 224 may face the outer surface of the sixth side member 226.

The two upper support members 232 may extend between the outer surface of the fifth side member 224 and the outer surface of the sixth side member 226. The two upper support members 232 may be made of an L-angle member having a shape of L2×2×⅜ as classified by AISC. Furthermore, the two upper support members 232 may be made of low carbon steel. For example, in some embodiments the low carbon steel may be A36 steel as classified by the ASTM.

The fifth and sixth side members 224, 226 may have a third plurality of slots 234 formed therein. For example, the third plurality of slots 234 may extend through the base portions of each of the fifth and sixth side members 224, 226. Each slot 234 of the third plurality of slots 234 may be sized and shape to receive a longitudinal end of a protective member 228 of the third plurality of protective members 228. For every protective member 228 included in the third protective member assembly 208, there may be a slot 234 in the fifth side member 224 for receiving a first longitudinal end of the protective member 228 and another slot 234 in the sixth side member 226 for receiving a second longitudinal end of the protective member 228 of the third plurality of protective members 228. The third plurality of slots 234 formed in each side member of the fifth and sixth side members 224, 226 may be oriented parallel to each other and in horizontal alignment. In other words, the longitudinal axes and vertical locations of the third plurality of slots 234 in fifth and sixth side members 224, 226 may be parallel to each other.

In some embodiments, the slots 234 of the third plurality of slots 234 may have a width within a range of 0.50 inch (¾") to 1.50 inches (1½"). In some embodiments, the slots 234 of the plurality of slots 234 may have a width within a range of 0.75 inch (¾") to 1.25 inches (1¼"). For example, the slots 234 of the third plurality of slots 234 may have a width of 1.0 inch. In some embodiments, the slots 234 of the plurality of slots 234 may have a length within a range of 3.0 inches to 6.0 inches. In some embodiments, the slots 234 of the plurality of slots 234 may have a length within a range 4.0 inches to 5.0 inches. For example, the slots 234 of the plurality of slots 234 may have a length of 4.5 inches (4½").

Each of the slots 234 of the third plurality of slots 234 may be inclined relative to the horizontal plane 162. Furthermore, in some embodiments, the third plurality of slots 234 may be inclined from a front of the protective barrier 100 (e.g., the side from the protective barrier 100 intended to face away from the asset) to the back of the protective barrier 100 (e.g., the side of the protective barrier 100 intended to face the asset). In other words, the third plurality of slots 234 may be defined such that a longitudinal axis of each slot 234 of the third plurality of slots 234 forms an included angle θ with the horizontal plane 162. In some embodiments, the angle θ may be within a range of 5° to 15°. In some embodiments, the angle θ may be within a range of 7° to 13°. For example, the angle θ may be at least about 10°. Accordingly, the third plurality of protective members 228 that may be inserted into the third plurality of slots 234 may be oriented at the same angle θ relative to the horizontal plane 162. As discussed above, having the protective members 228 of the third plurality of protective members 228 oriented at the angle θ relative to the horizontal plane 162 may encourage projectiles (e.g., rounds of ammunition) that may be fired at the protective members 228 to ricochet off of the protective members 228 instead of embedding into the protective members 228 and/or penetrating the protective members 228. Thus, having the protective member 228 oriented at an angle θ relative to the horizontal plane 162 may help to preserve the protective members 228 and may help to reduce damage experienced by the protective members 228 when stopping and/or deflecting projectiles that may be fired at an asset of which the protective barrier is positioned to protect.

The smaller angle θ at which the protective members 228 of the third plurality of protective member 228 are oriented relative to a horizontal plane 162 may allow the upper portion 102 of the protective member 228 to diffuse more air that the lower portion 104 of the protective member 228.

In some embodiments, the protective members 228 of the third plurality of protective members 228 may include shock absorbers 176. In some embodiments, the shock absorber 176 may wrap around portions of the protective member. In some embodiments, the shock absorber 176 may wrap completely around the protective member or the third plurality of protective members 228. The shock absorbers 176 may wrap around portions of the protective members 228 of the third plurality of protective members 228 proximate the longitudinal ends of the protective members 228. In some embodiments, the shock absorber 176 may include a rubber material. For example, the shock absorber 176 may be made of one or more of Nitrile, Ethylene-Propylene, Fluorocarbon, Chloroprene, Silicone, Fluorosilicone, Polyacrylate, Ethylene Acrylic, Styrene-butadiene, Polyurethane, and Natural rubber. In some embodiments, a thickness of the shock absorber 176 may be within a range of 0.13 inch (⅛") to 0.50 inch (½"). For example, a thickness of the shock absorber 176 may be at least about 0.25 inch (¼").

When the third plurality of protective members 228 is inserted into the third plurality of slots 234, the shock absorbers 176 of the protective members 228 may compress and press against interior edges of the third plurality of slots 234. The shock absorbers 176 may suspend the protective members 228 of the third plurality of protective members 228, and the protective members 228 may not contact the interior edges of the third plurality of slots 234. Furthermore, the shock absorbers 176 may perform in the same manner as described in regard to the shock absorbers 176 described in association with FIG. 4A.

The vertical protective plate 230 may extend vertically from bottom plate 216 of the base portion 210 at a center of the bottom plate 216. The vertical protective plate 230 may span the width of the protective barrier 100 between the side plates 220 of the base portion 210. The vertical protective plate 230 may be for providing protection in the upper portion 102 of the protective barrier 100 beneath the third protective member assembly 208 and between the inclined plates 218 of the base portion 210. In other words, the third protective member assembly 208 may or may not extend down into the inclined portion 210.

Live-fire ballistic testing performed by the inventor has shown that the third protective member assembly 208, when inserted into the third guide 222 and having protective members 228 with a thickness within the range of 0.44 inch (⁷⁄₁₆") to 0.50 inch (½") and being angled at least about 10° relative to a horizontal plane, are able to withstand .50 caliber armor piercing ammunition.

Figure 7:
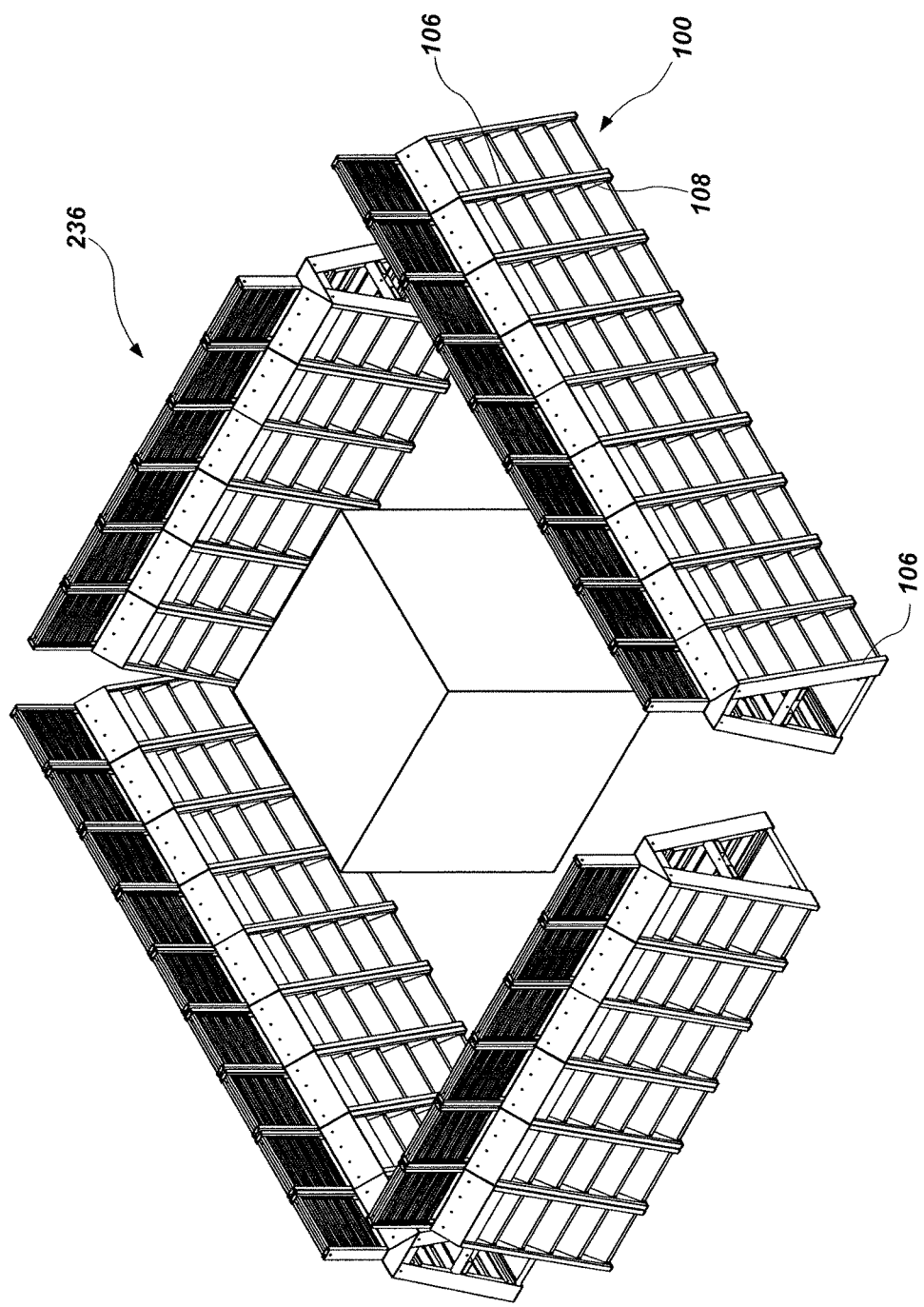
FIG. 7 is a perspective view of an assembly system of protective barriers installed to protect a transformer, according to an embodiment of the present disclosure.

FIG. 7 shows a perspective view of an assembly of protective barriers 236 oriented around an asset (e.g., an electrical power transformer). The protective barriers 100 as described in regard to FIGS. 1-6D may be attached together in side-by-side fashion to form assemblies of protective barriers in order to protect larger assets. For example, the protective barriers 100 may be attached together laterally with one or more fasteners. In some embodiments, a first A-frame structure 106 of a first protective barrier 100 may be fastened to a second A-frame structure 108 of a second protected barrier 100. In other words, the protective barriers 100 may be oriented next to each other in series.

As the materials of the elements of the protective barriers are commercially available materials, the protective barriers may be inexpensive to produce and maintain.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. A barrier, comprising:
   a first A-frame structure having a first leg and a second leg, the first leg defining a first channel;
   a second A-frame structure laterally spaced from and oriented parallel to the first A-frame structure and having a third leg and a fourth leg, the third leg defining a second channel; and
   a first protective member assembly extending laterally between the first leg and the third leg, the first protective member assembly comprising:
   an elongated first side member located adjacent and parallel to the first leg and within the first channel of the first leg;
   an elongated second side member located adjacent and parallel to the third leg and within the second channel of the third leg; and
   a first plurality of mutually vertically adjacent protective members extending substantially horizontally between the first side member and the second side member, wherein a lateral axis of each protective member of the first plurality of mutually vertically adjacent protective members forms a first included angle with a horizontal plane within a range of 55 to 75 degrees.

2. The barrier of claim 1, further comprising a second protective member assembly extending between the second leg and the fourth leg, the second protective member assembly:
    an elongated third side member;
    an elongated fourth side member; and
    a second plurality of mutually vertically adjacent protective members extending longitudinally between the third side member and the fourth side member, wherein a lateral axis of the each protective member of the second plurality of mutually vertically adjacent protective members forms an included second angle with a horizontal plane within a range of about 55 to about 75 degrees.

3. The barrier of claim 1, wherein the first included angle formed by the lateral axis of each protective member of the first plurality of mutually vertically adjacent protective members with the horizontal plane is about 60 degrees.

4. The barrier of claim 1, wherein a longitudinal axis of the first leg of the first A-frame structure and a longitudinal axis of the third leg of the second A-frame structure each form a third included angle with the horizontal plane, wherein the third included angle is within a range of 70 to 80 degrees.

5. The barrier of claim 1, each protective member of the first plurality of mutually vertically adjacent protective members comprising:
    a plate;
    a first frame member extending along at least a portion of a first lateral edge of the plate proximate each end thereof;
    a second frame member extending along at least a portion of a second, opposite lateral edge of the plate proximate each end thereof; and
    at least one shock absorber extending around portions of each of the first frame member and the second frame member proximate longitudinal ends of the protective member.

6. The barrier of claim 5, the elongated first and second side members of the first protective member assembly having a first plurality of slots defined therein for receiving and securing the longitudinal ends of the protective members of the first plurality of mutually vertically adjacent protective members, wherein the plate, first frame member, and second frame member and shock absorbers of each protective member of the first plurality of mutually vertically adjacent protective members are, in combination, sized and configured to be suspended within respective slots of the first plurality of slots.

7. The barrier of claim 1, the elongated first and second side members of the first protective member assembly having a first plurality of slots defined therein for receiving and securing longitudinal ends of the protective members of the first plurality of mutually vertically adjacent protective members.

8. The barrier of claim 1, further comprising a plurality of cross members extending between the first leg and the second leg and between the third and fourth leg.

9. The barrier of claim 1, wherein a center of gravity of the barrier is a distance from the horizontal plane that is less than or substantially equal to half of an overall height of the barrier.

10. The barrier of claim 1, wherein a lower lateral end of a first protective member of the first plurality of mutually vertically adjacent protective members is lower than an upper lateral end of an adjacent second protective member of the first plurality of mutually vertically adjacent protective members vertically below the first protective member of the first plurality of mutually vertically adjacent protective members.

11. The barrier of claim 1, wherein the first leg of the first A-frame structure and the third leg of the second A-frame structure form a guide into which the elongated first and second side members of the first protective member assembly are removably insertable.

12. A barrier, comprising:
    a lower portion, comprising:
        a first A-frame structure having a first leg and a second leg;
        a second A-frame structure oriented parallel to and laterally spaced from the first A-frame structure and having a third leg and a fourth leg; and
        a first protective member assembly extending between the first leg of the first A-frame structure and the third leg of the second A-frame structure, the first protective member assembly comprising:
            a first side member;
            a second side member; and
            a first plurality of protective members oriented at an acute included angle with respect to a horizontal plane and extending substantially horizontally between the first side member and the second side member; and
    an upper portion attached to top portions of the first and second A-frame structures of the lower portion of the barrier; the upper portion comprising:
        a first vertical post member;
        a second vertical post member laterally spaced from and aligned with the first vertical post member; and
        a third protective member assembly extending between the first vertical post member of the upper portion and the second vertical post member of the upper portion.

13. The barrier of claim 12, the third protective member assembly comprising:
    an elongated fifth side member;
    an elongated sixth side member; and
    a third plurality of protective members extending substantially horizontally between the fifth side member and the sixth side member, wherein a lateral axis of each protective member of the third plurality of protective members forms an included acute angle with the horizontal plane.

14. The barrier of claim 13, wherein the first plurality of protective members and the third plurality of protective members each comprise MIL-DTL-46100 wrought steel.

15. The barrier of claim 12, wherein the first vertical post member of the upper portion and the second vertical post member of the upper portion form a guide into which the fifth and sixth elongated side members of the third protective member assembly are removably insertable.

16. The barrier of claim 12, each protective member of the third plurality of protective members comprising:
    a plate; and
    shock absorbers extending around and directly contacting portions of the plate proximate longitudinal ends thereof.

17. The barrier of claim 12, wherein a center of gravity of the barrier is a distance from the horizontal plane that is less than or substantially equal to half of an overall height of the barrier.

18. A method of making a barrier, comprising:
    forming a first A-frame structure having a first leg and a second leg, the first leg defining a first channel;

forming a second A-frame structure having a third leg and a fourth leg and spaced from the first A-frame structure, the third leg defining a second channel;

forming a first protective member assembly comprising;
- orienting a lateral axis of each protective member of a first plurality of protective members to form an included angle with a horizontal plane when the first protective member is installed in the barrier within a range of 55 to 75 degrees;
- securing a first longitudinal end of each protective member of the first plurality of protective members to a first side member such that the included angle is maintained; and
- securing a second longitudinal end of each protective member of the first plurality of protective members to a second side member; and sliding the first protective member assembly into the first channel defined by the first leg of the first A-frame structure and the second channel defined by the third leg of the second A-frame structure.

19. The method of claim 18, further comprising:

forming a second protective member assembly comprising;
- orienting a lateral axis of each protective member of a second plurality of protective members to form an included angle with the horizontal plane within a range of 7 to 13 degrees when the second protective member is installed in the barrier;
- securing a first longitudinal end of each protective member of the second plurality of protective members to a fifth side member such that the included angle is maintained; and
- securing a second longitudinal end of each protective member of the second plurality of protective members to a sixth side member;

sliding the second protective member assembly into a second guide defined by a first post member and a parallel second post member spaced therefrom, the first post member and the second post member secured to and extending from a base portion of the barrier.

20. The method of claim 19, further comprising attaching the base portion to the first and second A-frame structures.

* * * * *

UNITED STATES PATENT AND TRADEMARK OFFICE
CERTIFICATE OF CORRECTION

PATENT NO. : 10,053,887 B2
APPLICATION NO. : 14/841114
DATED : August 21, 2018
INVENTOR(S) : Henry Shiu-Hung Chu et al.

Page 1 of 1

It is certified that error appears in the above-identified patent and that said Letters Patent is hereby corrected as shown below:

In the Specification
Column 2, Line 38, change "member the first" to --member of the first--

Signed and Sealed this
Twentieth Day of November, 2018

Andrei Iancu
*Director of the United States Patent and Trademark Office*